United States Patent
Yamada et al.

(10) Patent No.: US 6,742,062 B2
(45) Date of Patent: May 25, 2004

(54) INFORMATION REPRODUCTION APPARATUS AND INFORMATION REPRODUCTION METHOD

(75) Inventors: Takao Yamada, Tokorozawa (JP); Nobuo Ohyama, Tokorozawa (JP); Kazuo Kamei, Tokorozawa (JP); Eiji Kojima, Tokorozawa (JP); Masahiko Miyashita, Tokorozawa (JP); Toshio Ohtani, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 316 days.

(21) Appl. No.: 09/764,104

(22) Filed: Jan. 19, 2001

(65) Prior Publication Data
US 2001/0014073 A1 Aug. 16, 2001

(30) Foreign Application Priority Data
Jan. 19, 2000 (JP) .................................... P2000-014113

(51) Int. Cl.⁷ .............................................. G06F 13/14
(52) U.S. Cl. .......................... 710/65; 386/95; 386/126; 370/503; 370/536; 341/120
(58) Field of Search .............................. 710/65; 386/95, 386/126; 370/503, 536; 341/120

(56) References Cited
U.S. PATENT DOCUMENTS 5,805,545 A * 9/1998 Nakamaru et al. ........... 369/48
6,151,441 A * 11/2000 Kawamura et al. .......... 386/95
6,384,754 B1 * 5/2002 Park ........................... 341/120
6,516,005 B1 * 2/2003 Murayama et al. ......... 370/503
6,611,656 B2 * 8/2003 Okada et al. ............... 386/125

FOREIGN PATENT DOCUMENTS

| JP | 01086365 A | * | 3/1989 | .......... G11B/20/02 |
| JP | 01122071 A | * | 5/1989 | .......... G11B/20/02 |
| JP | 09102169 A | * | 4/1997 | .......... G11B/20/10 |

* cited by examiner

*Primary Examiner*—Abdelmoniem Elamin
(74) *Attorney, Agent, or Firm*—Sughrue, Mion, PLLC (57) ABSTRACT

An information reproduction apparatus which can perform repetitive reproduction is provided. In the apparatus, Information read from an information recording medium is decoded by the plurality of decoding devices. Then a source of an output of the information reproduction apparatus is switched among outputs of a plurality of the decoding devices. If a start position to start repetitive reproduction is designated, another decoding device except one decoding device whose output is currently switched as the source is controlled so as to be able to begin to decode the information on and after the start position. Then if a start instruction is provided, the source is switched from the output of the one decoding device to the output of the another device. Further, the another decoding device is controlled to decode the information on and after the start position, and the one decoding device is controlled to be able to begin to decode the information on and after the start position.

18 Claims, 5 Drawing Sheets

FIG. 5D ered together with time information indicating a time at which respective items of information should be reproduced when a reproduction start position that each CD or the like has is defined as a reference. Thus, it is possible not only to cause general normal reproduction in which recorded information is reproduced in the recorded order, but also to extract and listen to only a desired music number of a plurality of recorded music numbers or to listen to the music number by randomly changing the reproduction order in a CD, for example.

INFORMATION REPRODUCTION APPARATUS AND INFORMATION REPRODUCTION METHOD

BACKGROUND OF THE INVENTION

1. Field of the Invention

The present invention belongs to a technical field of an information reproduction apparatus and method for reproducing information such as audio or video using an information recording medium such as high density optical disc capable of recording information such as voice or image represented by DVD with high density.

2. Description of the Related Art

Conventionally, so called CD (Compact Disc), LD (Laser Disc) and the like are well employed in general as optical discs having information such as voice or image recorded therein.

In these CDs and the like, voice information and image information are recorded together with time information indicating a time at which respective items of information should be reproduced when a reproduction start position that each CD or the like has is defined as a reference. Thus, it is possible not only to cause general normal reproduction in which recorded information is reproduced in the recorded order, but also to extract and listen to only a desired music number of a plurality of recorded music numbers or to listen to the music number by randomly changing the reproduction order in a CD, for example.

Voice information and image information in a recording apparatus or reproduction apparatus for such CD or LD is handled in units of audio frames or video frames during recording, editing, and reproducing, and can be accessed in units of these frames.

In addition, in the CD or LD, it is possible to execute variable speed reproduction such as fast feed reproduction or slow reproduction is possible. Further, it is possible to speedily search a desired reproduction point or to carefully observe a desired reproduction point.

In the conventional apparatus, however, although a reproduction point is searched speedily, in the case where repetitive reproduction is specified at a predetermined reproduction interval during continuous reproduction of a dynamic image, the time required for the search is a sufficient time to lose continuity of the dynamic image. Therefore, in the case where repetitive reproduction is specified at a predetermined reproduction interval, there has been a problem that reproduction of the dynamic image is interrupted because of searching the repetitive reproduction start position.

In addition, a conventional repetitive reproduction start position is always set at the head of GOP. Thus, there has been a problem that displacement occurs between a user's desired repetitive reproduction position and an actually repetitively reproduced position. In order to solve this problem, it has been necessary to store an elapsed reproduction time when a repeat instruction is issued, and perform pseudo reproduction processing from the head of GOP to the elapsed reproduction time. Thus, there has been a problem that more time is required for reproduction.

SUMMARY OF THE INVENTION

The present invention has been made in view of the above-described problems. It is an object of the present invention to provide an information reproduction apparatus capable of, in the case where a repeat instruction is issued at the time of reproduction, performing repetitive reproduction from an exact position without losing continuity of a dynamic image.

The above object of the present invention can be achieved by an information reproduction apparatus as follows. The information reproduction apparatus is provided with: a reading device for reading information recorded in an information recording medium; a plurality of decoding devices for decoding the information read by the reading device; an output switching device for switching a source of an output of the information reproduction apparatus among outputs of a plurality of the decoding devices; a designating device for designating a start position to start repetitive reproduction; a decode controlling device for controlling the decoding devices so that another decoding device except one decoding device whose output is currently switched as the source can begin to decode the information on and after the start position after the start position is designated by the designating device; a switch controlling device for controlling the output switching device; and a start instructing device for instructing the switch controlling device to start repetitive reproduction. Further, the switch controlling device controls the output switching device so as to switch the source from the output of one decoding device whose output is currently switched as the source to the output of another decoding device when the switch controlling device is instructed to start repetitive reproduction by the start instructing device. Moreover, the decode controlling device controls the decoding devices so that said another decoding device decodes the information on and after the start position and said one decoding device can begin to decode the information on and after the start position when the switch controlling device is instructed to start repetitive reproduction by the start instructing device.

According to the information reproduction apparatus, the reading device reads information recorded in the information recording medium. Then, a plurality of decoding devices decode the information read by the reading device. However, the output switching device switches a source of an output of the information reproduction apparatus among outputs of a plurality of the decoding devices. Therefore, the information decoded by any one of the decoding devices is outputted from the information reproduction apparatus. Then, a user can operate the designating device to designate a start position to start repetitive reproduction while the user is listening audio information or watching video information. If the user operates the designating device, the designating device designates a start position to start repetitive reproduction. After the start position is designated by the designating device, the decode controlling device controls the decoding devices so that another decoding device except one decoding device whose output is currently switched as the source can begin to decode the information on and after the start position. Then, if the user operates the start instructing device, the start instructing device instructs the switch controlling device to start repetitive reproduction. Accordingly, the switch controlling device controls the output switching device so as to switch the source from the output of one decoding device whose output is currently switched as the source to the output of another decoding device. Further, the decode controlling device controls the decoding devices so that said another decoding device decodes the information on and after the start position and said one decoding can begin to decode the information on and after the start position. As a result, repetitive reproduction from the designated start position is momentously performed every time when the start instructing device is operated. Therefore, the repetitive reproduction from the exact start position is performed without losing continuity of a dynamic image. Furthermore, if the switch controlling device is further instructed to start repetitive reproduction by the start instructing device during repetitive reproduction, the above-mentioned progressing is executed as well. Therefore, repetitive reproduction from the designated start position is momentously performed every time when the start instructing device is operated.

In one aspect of the information reproduction apparatus, the information reproduction apparatus further includes a buffer device and a buffer controlling device. The buffer device stores information recorded in the information recording medium at a front stage of said decoding devices. When the start position is designated, the buffer controlling device stores the information at least on and after the start position in the buffer device. Further, when the switch controlling device is instructed to start repetitive reproduction by the start instructing device, the buffer controlling device supplies the information on and after the start position from the buffer device to said another decoding device.

According to this aspect, until new information is stored in the buffer device after the repetitive reproduction started, the repetitive reproduction is executed by using the information already stored in the buffer device. Therefore, it is given enough time to store the new information in the buffer device. As a result, during the reproduction using the stored information in the buffer device, the new information having the sufficient amount is stored, so that the reproduction is performed without losing continuity of a dynamic image after the repetitive reproduction started.

The above object of the present invention can be achieved by an information reproduction method as follows. The information reproduction method is provided with the processes of: reading information recorded in an information recording medium; decoding the read information by using a plurality of decoding devices; switching a source of an output of the information reproduction among outputs of a plurality of the decoding devices; designating a start position to start repetitive reproduction; controlling the decoding devices so that another decoding device except one decoding device whose output is currently switched as the source can begin to decode the information on and after the start position after the start position is designated; providing an instruction of start of repetitive reproduction; switching the source from the output of one decoding device whose output is currently switched as the source to the output of another decoding device when the instruction is provided; and controlling the decoding devices so that said another decoding device decodes the information on and after the start position and said one decoding device can begin to decode the information on and after the start position when the instruction is provided.

According to the information reproduction method, the information recorded in the information recording medium is read. Then, the read information is decoded by a plurality of decoding devices. However, a source of an output of the information reproduction is switched among outputs of a plurality of the decoding devices. Therefore, the information decoded by any one of the decoding devices is outputted. Then, a user can designate a start position to start repetitive reproduction while the user is listening audio information or watching video information. If the user designates the start position, the decoding device is controlled so that another decoding device except one decoding device whose output is currently switched as the source can begin to decode the information on and after the start position. Then, if the user provides an instruction of start of repetitive reproduction, the source is switched from the output of one decoding device whose output is currently switched as the source to the output of another decoding device. Further, the information on and after the start position is decoded by said another decoding device and said one decoding device can begin to decode the information on and after the start position. As a result, repetitive reproduction from the designated start position is momentously performed every time when the start instruction is provided. Therefore, the repetitive reproduction from the exact start position is performed without losing continuity of a dynamic image. Furthermore, if the start instruction is provided during repetitive reproduction, the above-mentioned progressing is executed as well. Therefore, repetitive reproduction from the designated start position is momentously performed every time when the start instruction is provided.

In one aspect of the information reproduction method, the information reproduction method further the processes of storing the information in a buffer device and supplying the information to the decoding device. The information at least on and after the start position is stored in the buffer device before the information is decoded when the start position is designated. Then, when the start position is designated, the information at least on and after the start position from the buffer device to said another decoding device.

According to this aspect, until new information is stored in the buffer device after the repetitive reproduction started, the repetitive reproduction is executed by using the information already stored in the buffer device. Therefore, it is given enough time to store the new information in the buffer device. As a result, during the reproduction using the stored information in the buffer device, the new information having the sufficient amount is stored, so that the reproduction is performed without losing continuity of a dynamic image after the repetitive reproduction started.

DETAILED DESCRIPTION OF THE PREFERRED EMBODIMENTS

Hereinafter, preferred embodiments of the present invention will be described with reference to the accompanying drawings.

Figure 1:
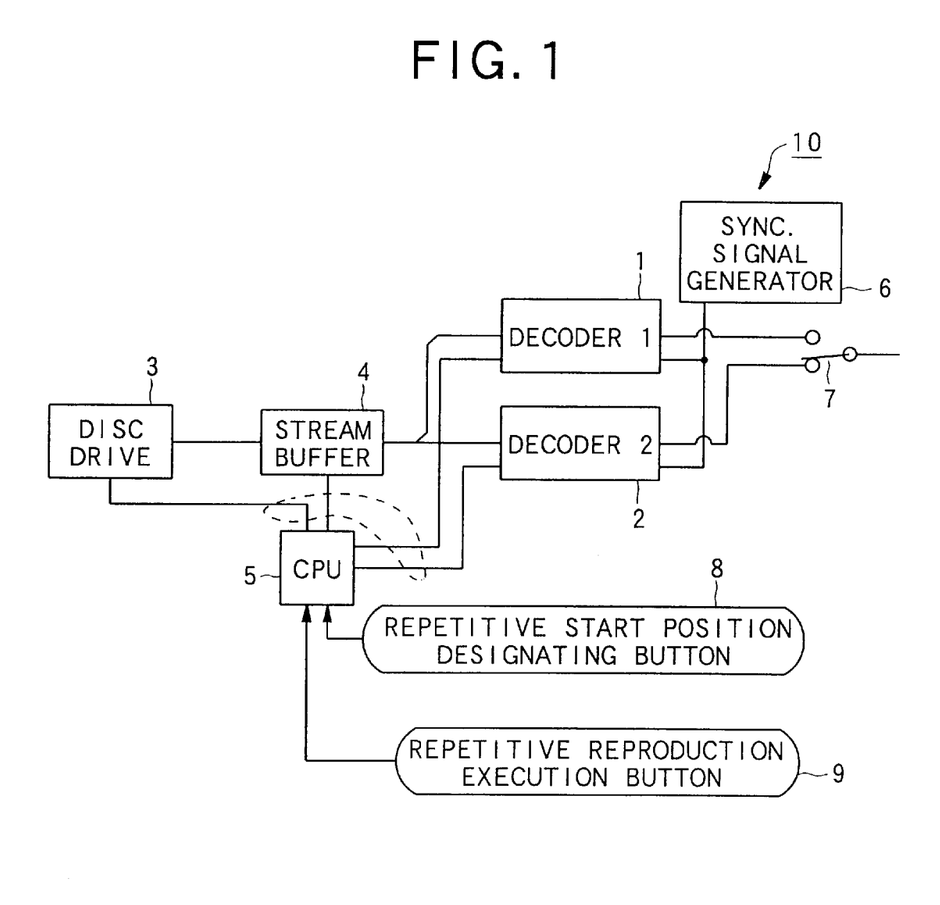
FIG. 1 is a block diagram showing a general configuration of an information reproduction apparatus according to a preferred embodiment of the present invention.

FIG. 1 is a block diagram showing a general configuration of a DVD reproduction apparatus as an example of an information reproduction apparatus in the present embodiment.

As shown in FIG. 1, a DVD reproduction apparatus 10 is composed of a decoder 1, a decoder 2, a disc drive section 3, a stream buffer 4, a CPU 5, a synchronization signal generator 6, an output switch portion 7, a repetition start position designating button 8, and a repetitive reproduction execution button 9.

The disc drive section 3 is means for extracting data from a DVD. This section is composed of, for example, a spindle motor, a slider motor, a drive controller, a pickup, a modulation correction section and the like, which are not shown in the figure. The pickup includes, for example, a laser diode, a deflection beam splitter, an object lens, an optical detector and the like, which are not shown in the figure. The pickup irradiates the DVD (not shown) with a light beam as reproduction light, receives the reflection light from the DVD of the light beams, and outputs a detection signal corresponding to an information pit formed on the DVD. At this time, an information track on the DVD is exactly irradiated with the light beam. In addition, a control signal is outputted to the spindle motor and the slider motor by means of the drive controller so as to exactly connect a focal point on an information recording face on the DVD, and tracking servo control and focus servo control are performed to the object lens. Further, a detection signal outputted from the pickup is inputted to the demodulation correction section, demodulation processing and error correction processing are performed, and a modulation signal is generated, and then, is outputted to the stream buffer 4.

The stream buffer 4 is means for temporarily storing composite stream data such as video or audio compressed in accordance with the MPEG2 (Moving Picture Expert Group 2) system. This buffer is composed of RAM of FIFO (First In First Out) and the like.

In the DVD video standards, composite stream data is composed in reproduction units called cells having ID numbers assigned thereto. Further, each cell is composed of one or more information units called VOBU (Video Object Unit). One VOBU has a reproduction time of 0.4 second to 1 second. A navigation pack having search information recorded therein for reproduction and information concerning reproduction control is always placed at the head of the VOBU. Then, video data, audio data, subsidiary picture data and the like, each corresponding to integer number of GOPs (Group Of Picture) are packed, and are inserted by time division.

Here, GOP is a minimum unit of image that can be reproduced solely in the standards of the MPEG2 system, and video data is composed of one or more GOPs. In addition, a variable rate system in which a quantity of data contained in each GOP is not constant is adopted in the MPEG2 system. Thus, in the DVD apparatus 1, a difference in the amount of data between GOPs is compensated for by using the stream buffer 4.

In addition, in the DVD, there is a case in which one cell is recorded to be divided into a plurality of units called interleaved unit. In this case, only interleaved units that configures cells of the same ID numbers are continuously detected and reproduced while causing track-jump from one interleave unit to another interleaved unit. One interleaved unit has a reproduction time in which data can be continuously outputted from the stream buffer 4, even if data input to the stream buffer 4 is stopped by the pickup jumping from one interleaved unit to another interleaved unit. The DVD reproduction apparatus 10 is configured so as to continuously output data discontinuously inputted to the stream buffer 4 in every interleaved unit by using the stream buffer 4. With such configuration, cells of discrete ID numbers can be reproduced seamlessly.

In addition, an output of the composite stream data from the stream buffer 4 to the decoders 1 and 2 is controlled by means of the CPU 5 so that decode processing is not interrupted when the buffers in the decoders 1 and 2 overflow or become empty.

The CPU 5 is a means for outputting a control signal to the drive controller of the disc drive section 3, the stream buffer 4, the decoders 1 and 2, and the output switch section 7, respectively, and controlling operation of each section. In addition, the CPU 5 is a means for controlling repetition start processing described later according to an input of the repetition start position designating button 8, and controlling repetitive reproduction processing described later according to an input of the repetitive reproduction executing button 9.

The decoders 1 and 2 have the same configurations, and are means for decoding composite stream data outputted from the stream buffer 4 to video data, audio data, and subsidiary picture data.

The decoders 1 and 2 in the present embodiment are composed of, for example, a de-multiplexer, a video buffer, an audio buffer, a subsidiary picture buffer, a video decoder, an audio decoder, a subsidiary picture decoder and the like, which are not shown in figures, in order to decode the video data, the audio data and the subsidiary picture data described above.

The de-multiplexer separates the video data, the audio data, and the subsidiary picture data from the composite stream data, and outputs them to the video buffer, the audio buffer, and the subsidiary picture buffer, respectively.

The audio data includes linear PCM (Pulse Code Modulation) using a sampling frequency of 48 kHz, MPEG audio, or Dorby AC-3 (Dolby Audio Code number 3). The audio buffer having the audio data inputted thereto is composed of a FIFO memory or the like, temporarily stores the input audio data, and outputs the stored data to the audio decoder. The audio decoder demodulates the audio data, and outputs the demodulated audio data to the output switch section 7.

The subsidiary picture data defines data superimposed on a main video such as subtitle, menu, words display of karaoke by a bit map, and is compression-coded by a run length system. The subsidiary picture buffer having the subsidiary picture data inputted thereto temporarily stores the inputted subsidiary picture data, and outputs the stored data to the subsidiary picture decoder. The subsidiary picture buffer outputs subsidiary picture information included in the subsidiary picture data in synchronism with image information corresponding to the subsidiary picture information. Then, the subsidiary picture data synchronized with the image information is inputted to the subsidiary picture decoder, is decoded, and is inputted to the output switch section 7 as decoded subsidiary picture data.

Figure 2:
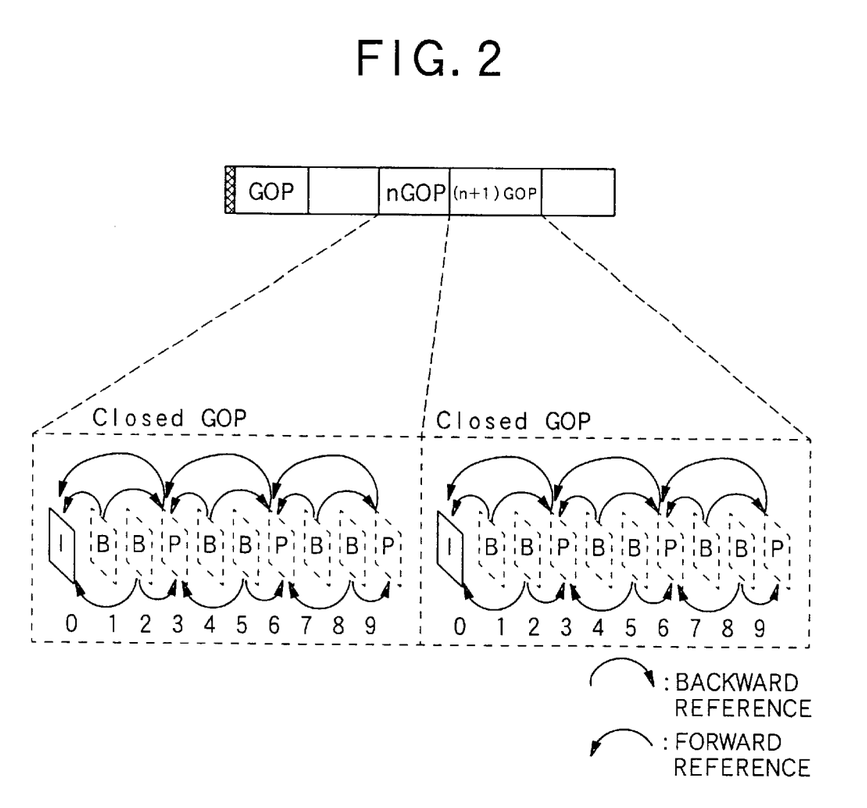
FIG. 2 is a diagram showing a closed GOP.

The video data is compression-coded by means of the MPEG2 system, and is composed of an information unit called a video pack. This video pack is further composed of one or plural GOPs described above. FIG. 2 shows a case in which one GOP is composed of 10 frame images converted to a reproduction time of about 0.5 second. However, the number of frame images is principal, and the number of frame images included in one GOP is not constant in the MPEG2 system.

In FIG. 2, a frame image indicated by a symbol I is called I picture (Intra-coded picture), and a complete frame image can be reproduced by only its image.

In addition, a frame image indicated by a symbol P is called P picture (Predictive-coded Picture), and is generated by forward predictive-coding processing. The forward predictive-coding processing is processing for creating a predictive image on the basis of an image to be decoded prior to a current image targeted for encoding, and encoding a difference between this predictive image and the current image targeted for encoding. If an image is recorded in the DVD after encode processing, decoding is performed in accordance with a recording sequence in the DVD when the image is reproduced. The "image to be decoded prior to" means an image in which the decoding sequence is precedent with an elapse of time. In addition, the predictive image is an image created by decoding a picture encoded previously, and performing movement compensation for the decoded image. In the case where the P picture is encoded, predictive image is created based on the previously encoded I picture or P picture.

Further, a frame image indicated by a symbol B is called B picture (Bidirectionally predictive-coded picture), and is produced by predictive coding processing over the forward and backward directions. The backward predictive coding processing is processing for creating a predictive image on the basis of an image to be decoded more successively than a current image targeted for encoding, and encoding a difference between this predictive image and the current image targeted for encoding. Here, "an image to be decoded more successively" means an image in which the sequence of decoding after recording onto the DVD, for example, is successive after an elapse of time. Namely, in the case where the B picture is encoded, two predictive images are created, respectively, based on two images, which are composed of the I pictures or the P pictures or I and P pictures encoded previously, in which the sequence of decoding after recording onto the DVD is precedent and successive after an elapse of time.

In FIG. 2, a predictive relationship (compensation relationship) between pictures is indicated by the arrow described at the upper and lower parts of each picture. Here, the predictive relationship means a relationship between an image targeted for predictive coding processing and a reference image. Predictive coding processing is processing in which a signal value of an image is presented by using a difference between the signal values of the precedent or successive images after an elapse of time. The aforementioned I picture is created by intra-frame predictive encoding (intra-coding) in which a predictive memory is not employed. The P picture is created by forward intra-frame prediction using one prediction memory, and the B picture is created by bidirectional intra-frame prediction using two prediction memories.

The video buffer temporarily stores the above video data, and outputs it to the video decoder. The video buffer is intended to compensate for dispersion in the amount of data for each picture in the video data compressed by the MPEG2 system. Then, the video data for which the dispersion in the amount of data has been compensated is inputted to the video decoder, is decoded by means of the MPEG2 system, and is inputted as decoded video data to the output switch section 7.

The output switch section 7 is means for outputting outputs of the decoders 1 and 2 to the reproduction output section (not shown). The CPU 5 controls which of the decoders are used for switching. The reproduction output section (not shown) is composed of a video encoder, a D/A converter 11, an amplifier and the like, for example.

The synchronization signal generator 6 generates a synchronization signal for the decoders 1 and 2, and the outputs of the decoders 1 and 2 are performed in synchronism with this synchronization signal. Therefore, even in the case of switching into any decoder, a shift does not occur with an output signal.

The repetition start position designating button 8 is a button employed for designating a position to be repeated while the user is observing a video image. When the user presses this button, the CPU 5 performs repetition start position setting process.

The repetition reproduction execution button 9 is a button to be pressed when the user wants to execute repetitive reproduction. When the user presses this button, the CPU 5 starts repetitive reproduction processing from the set repetition start position.

The description of the general configuration of the DVD reproduction apparatus according to the present embodiment has now been completed.

(Repetitive Reproduction Processing)

Figure 3:
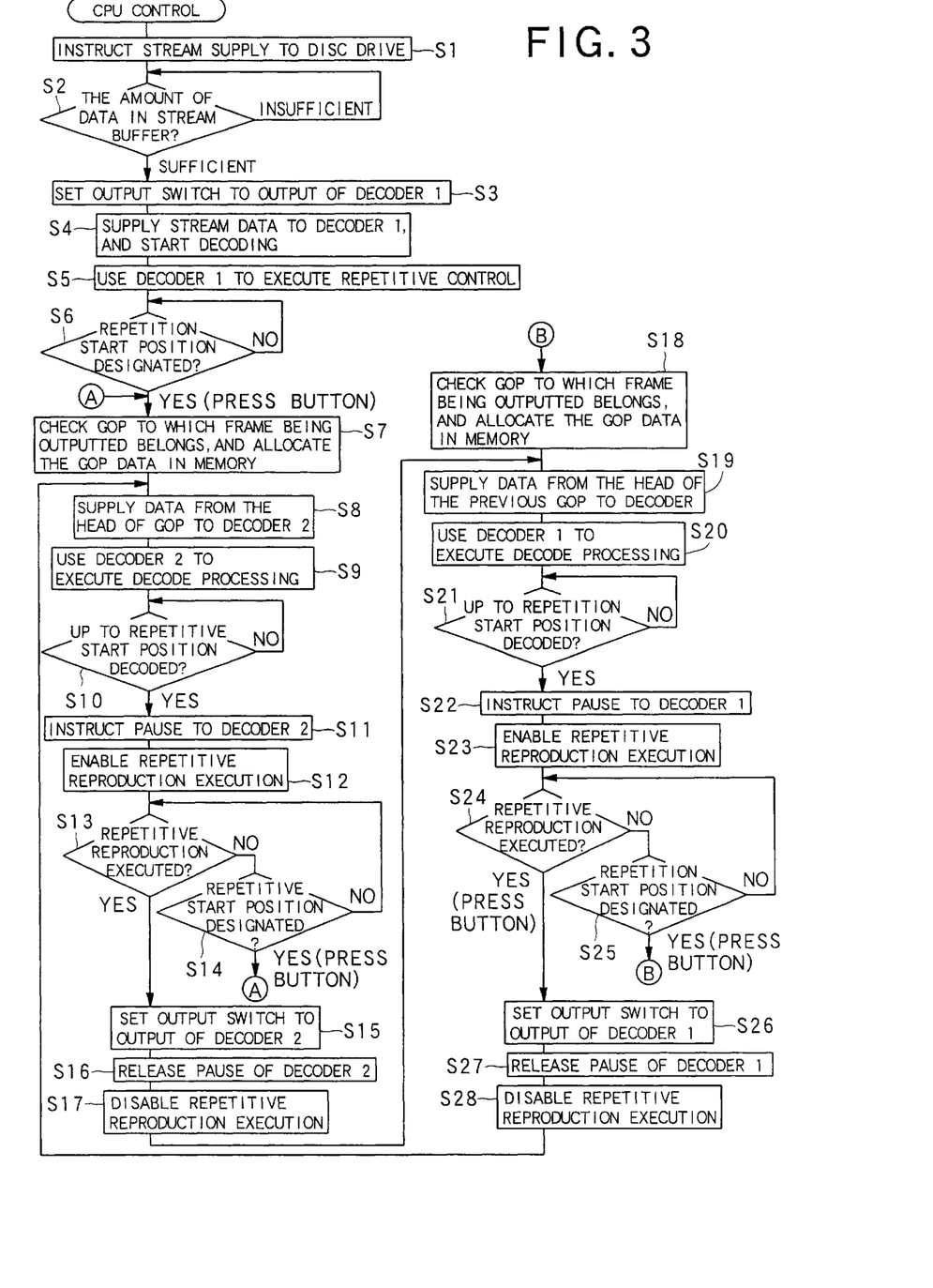
FIG. 3 is a flowchart showing repetitive reproduction processing in the information reproduction apparatus shown in FIG. 1.
Figure 4:
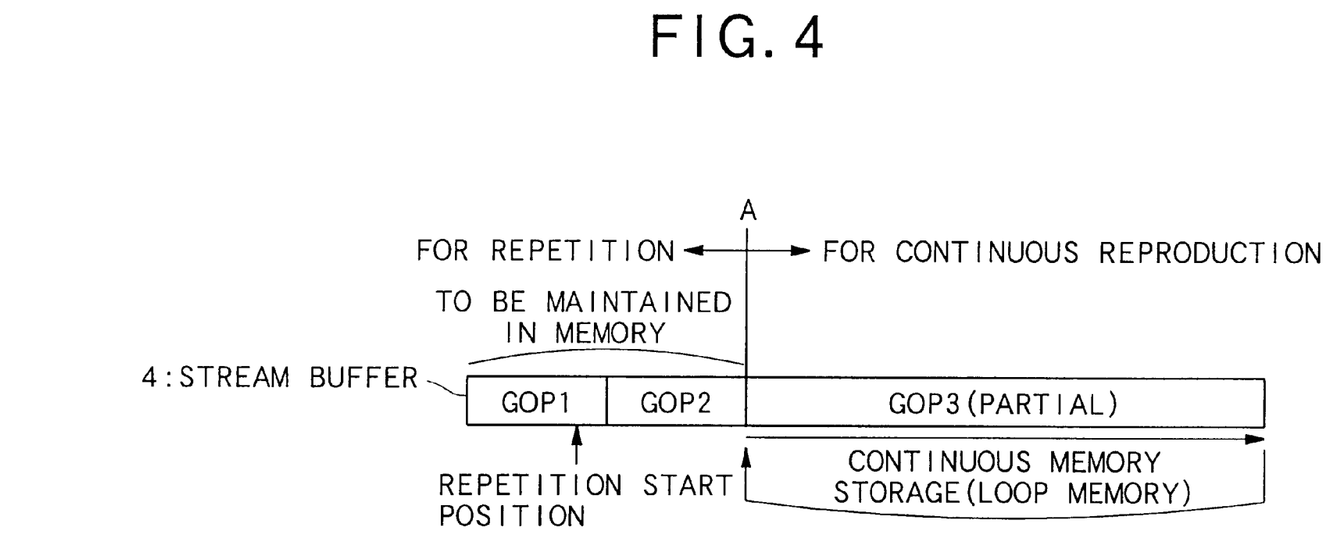
FIG. 4 is a diagram showing a method of using a memory area in a stream buffer in the case where a repetition start position is specified.

Now, repetitive reproduction processing in the DVD reproduction apparatus according to the present invention will be described with reference to a flowchart shown in FIG. 3, an illustration of a memory area of a stream buffer shown in FIG. 4, and a timing chart shown in FIG. 5.

First, when the CPU 5 is instructed to start a repetitive operation by pressing a reproduction switch or the like (not shown), the CPU 5 instructs the disc drive section 3 to supply a composite data stream (step S1).

In this manner, the disc drive section 3 starts the supply of the composite data stream to the stream buffer 4, and the composite data stream is stored in the stream buffer 4. Accordingly, the CPU 5 determines whether or not sufficient amount of data is stored for seamless reproduction in the stream buffer 4 (step S2).

In the case where it is determined that sufficient amount of data has been stored in the stream buffer 4 after an elapse of a predetermined time, for example, the CPU 5 sets an output of a decoder to that of the decoder 1 by means of the output switch section 7 (step S3). In addition, at this time, the decoder 2 is in a pause state. This setting may be provided on the decoder 2 without being limited to the decoder 1 in particular.

The CPU 5 supplies stream data from the stream buffer 4 to the decoder 1, and instructs the decoder 1 to begin to decode (step S4). In this manner, in the decoder 1, the decoding of video data and audio data, and subsidiary picture data as required is started, the data compressed and encoded by means of the MPEG2 system is decompressed and decoded, and a video frame and audio data are outputted (step S5).

Next, during reproduction output, the CPU 5 determines whether or not the repetitive start position designating button 8 has been pressed (step S6). In the case where the button is not pressed (step S6: NO), general reproduction control is continued.

The user can designate a repetition start position by pressing the repetition start position designating button 8 during pause as well as during reproduction.

Figure 5A:
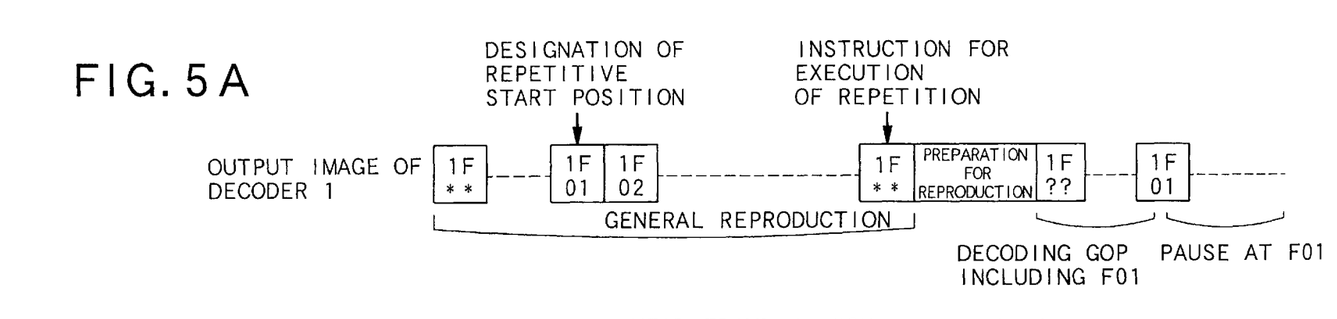
FIG. 5A is a timing chart showing an output timing of a decoder 1 during repetitive reproduction processing in the information reproduction apparatus shown in FIG. 1.

As shown in FIG. 5A, however, in the case where the repetition start position designating button 8 is pressed during predetermined frame output ("Yes" at step S6), a GOP to which a frame in which an output is performed at this time belongs is allocated in the stream buffer 4 (step S7).

At this time, the data on some GOPs following the GOP may be allocated simultaneously. In an example shown in FIG. 4, the GOP1 and GOP2 are maintained in a repetition area. In this manner, in the case where a GOP is allocated in the stream buffer 4 according to the pressing of the repetition start position designating button 8, a storage area in the stream buffer 4 is divided into a repetition area and a continuous reproduction area. The continuous reproduction area is successively used as a loop memory. Then, while encoded data is inputted, an output to the decoder 1 is continued. In addition, in the repetition area, some GOPs following the GOP as well as GOP that provides an image output corresponding to the designated repetition start position may be maintained. In an example shown in FIG. 4, the GOP2 as well as the GOP1 is maintained. This is because, in the case where repetitive reproduction is executed, the successive GOP is read from the DVD. In addition, this is because, even in the case where a certain degree of time is required to maintain a sufficient amount of data in the stream buffer 4, repetitive reproduction is performed without any interruption in this duration. Therefore, the amount of data to be maintained in this duration is determined in consideration of a time of supplying a sufficient quantity of data to the stream buffer 4.

Next, the CPU 5 supplies data on GOP maintained in the repetition area of the stream buffer 4 from the head of the GOP to the decoder 2 (step S8), and starts execution of decode processing to the decoder 2 (step S9). In addition, at this time, the execution of decode processing is inhibited. Even if the repetition reproduction execution button 9 is pressed before the execution of repetition reproduction is inhibited, an arrangement is provided so as not to accept its input.

Figures 5B, 5C:
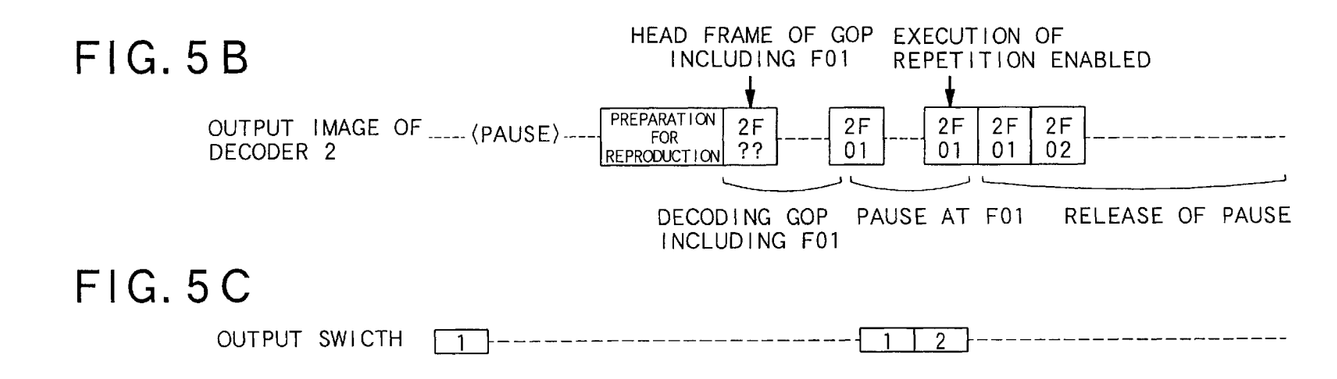
FIG. 5B is a timing chart showing an output timing of a decoder 2 during repetitive reproduction processing in the information reproduction apparatus shown in FIG. 1.
FIG. 5C is a timing chart showing a decoder switching timing during repetitive reproduction processing in the information reproduction apparatus shown in FIG. 1.
Figure 5D:
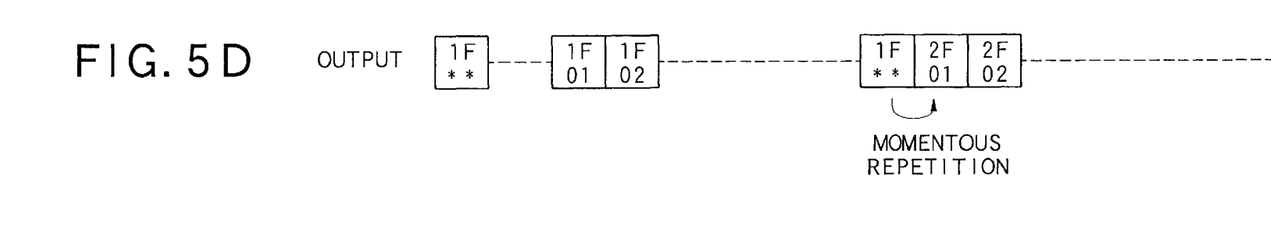
FIG. 5D is a timing chart showing an output timing of a frame from an output switch portion during repetitive reproduction processing in the information reproduction apparatus shown in FIG. 1.

As a result of the above processing, in the decoder 2 that has been in a pause state, as shown in FIG. 5B, decoding starts from the head frame of the GOP that includes a frame when the repetition start position is specified.

At this time, the CPU 5 starts determination as to whether or not decoding terminates up to the repetition start position (step S10). This determination may be performed as follows so as to determine that decoding terminates up to the repetition start position. That is, when the repetition start position designating button 8 is pressed, a time stamp is acquired; and even during decoding caused by the decoder 2, a time stamp from the head of GOP is acquired. Then, when the previously acquired time stamp is coincident with a time stamp acquired during decoding caused by the decoder 2, it is determined that decoding terminates up to the repetition start position.

When it is determined that decoding has terminated up to the repetition start position (step S10: YES), the CPU 5 instructs the decoder 2 to pause (step S11). In this manner, in the decoder 2, as shown in FIG. 5B, until the CPU 5 is instructed to execute repetition, decoding is temporarily interrupted in a state in which the repetition start position is searched. In addition, as shown in FIG. 4, in the repetition area of the stream buffer 4, a pointer indicative of a position of the output data moves to the specified repetition start position. Thus, in the case where the CPU 5 has been instructed to execute repetition, the data following the specified repetition start position can be outputted immediately to the decoder 2.

In addition, at this time, when the execution of repetitive reproduction is enabled, and the subsequent repetition reproduction execution button 9 is pressed, the CPU accepts this input, and performs repetition reproduction execution processing. In this manner, arrangement is provided such that the search of the designated repetition start position terminates; the repetition start position on the repetition area of the stream buffer 4 is determined; and a repetition reproduction execution instruction is disabled until the execution of repetitive reproduction from the position has been enabled. Thus, repetitive reproduction is not performed as long as such reproduction is not ready.

Hereinafter, the CPU 5 determines whether or not the repetition reproduction execution button 9 is pressed while decoding caused by the decoder 1 is continued (step S13). In addition, in the case where the repetition reproduction execution button 9 is not pressed (step S13: NO), the repetition start position designating button 8 is pressed, and it is determined as to whether or not the specification of a new repetition start position has occurred (step S14). Here, in the case where the repetition start position designating button 8 is pressed (Yes: Step S14), processing from the aforementioned step S7 is repeated, and preparation for a new repetition start position is executed.

On the other hand, in the case where it is determined that the repetition reproduction execution button 9 is pressed (Yes: step S13), the CPU 5 sets to the decoder 2 for the switching of decoder output caused by the output switch section 7 (step S15). Further, the pause of the decoder 2 is released (step S16). In this manner, an output from the output switch section 7 is an output from the decoder 2 momentarily, and is switched to an output from the specified repetition start position.

For example, as shown in FIG. 5A, in the case where the CPU 5 is instructed to execute repetitive reproduction during output of an IF frame, the pause of the decoder 2 is released at the timing, as shown in FIG. 5B. As shown in FIG. 5C an output of the output switch section 7 is switched from the decoder 1 to the decoder 2. As a result, as shown in FIG. 5D, an output from the output switch section 7 is switched from the IF frame to a frame of 2FO1 momentarily, repetitive reproduction from the designated repetition start position is performed.

In addition, the CPU 5 switches a decoder output to the decoder 2, and at the same time, the execution of repetitive reproduction is inhibited again (step S17). Then, preparation for repetitive reproduction relevant to the decoder 1 is started.

Namely, while data is supplied from the head of GOP stored in the repetition area of the stream buffer 4 to the decoder 1 (step S19), and decode processing is executed by the decoder 1 (step S20), it is determined as to whether or not decoding is performed up to the repetition start position (step S21). Then, in the case where decoding is performed up to the repetition start position (step S21: YES), the decoder 1 is instructed to pause (step S22), and the execution of repetitive reproduction is enabled (step S23).

Therefore, when the repetition reproduction execution button 9 is pressed in this state (Yes: Step S24), the CPU 5 switches a decoder output to the decoder 1 by means of the output switch section 7 (step S26), and the pause of the decoder 1 is released (step S27). In this manner, repetitive output is an output from the decoder 1 momentously, and is switched to an output from the specified repetition start position. In addition, the CPU 5 disables the execution of repetitive reproduction at the same time, and restarts preparation for the repetitive start position relevant to the decoder 2 (step S8 and subsequent).

On the other hand, in the case where the repetition reproduction execution button 9 is pressed while the decoder 1 is instructed to pause (step S24: NO), it is determined as to whether the repetitive start position specifying button 8 is newly pressed (step S25). In the case where the button is pressed (Yes: Step S25), GOP belonging to a frame at a time when the repetition start position designating button 8 is pressed is checked, and the GOP data is newly allocated to the stream buffer 4 (step S18). Then, preparation for repetitive start position relevant to the decoder 1 is restarted (step S19 and subsequent).

Hereinafter, the aforementioned processing is repeated, whereby repetitive reproduction from a specified position is momentously performed every time when the repetitive reproduction execution button 9 is pressed. Further, during repetitive reproduction as well, the repetitive start position can be newly set.

In the aforementioned embodiment, although there has been described an example in which two decoders are provided, the present invention is not limited to such arrangement, and three or more decoders may be provided as required. With this arrangement, a plurality of repetition start positions are set simultaneously, and can be switched.

In addition, in each of the aforementioned embodiments, MPEG audio, AC-3 and the like as well as linear PCM can be employed as a format of audio data.

In addition, a compression system is not limited to the MPEG2 system, and the MPEG1 system may be employed. Further, in the present embodiment, although there has been described an example when the DVD is employed as a storage medium having video and audio data recorded therein, the present invention is not limited to such arrangement. Furthermore, VCD (Video Compact Disc) or hard disc may be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. P2000-14113 filed on Jan. 19, 2000 including the specification, claims, drawings and summary is incorporated herein by reference in its entirety.

What is claimed is:

1. An information reproduction apparatus comprising:
   a reading device for reading information recorded in an information recording medium;
   a plurality of decoding devices for decoding the information read by the reading device;
   an output switching device for switching a source of an output of the information reproduction apparatus among outputs of a plurality of the decoding devices;
   a designating device for designating a start position to start repetitive reproduction;
   a decode controlling device for controlling the decoding devices so that another decoding device except one decoding device whose output is currently switched as the source can begin to decode the information on and after the start position after the start position is designated by the designating device;
   a switch controlling device for controlling the output switching device; and
   a start instructing device for instructing the switch controlling device to start repetitive reproduction,
   wherein
   the switch controlling device controls the output switching device so as to switch the source from the output of one decoding device whose output is currently switched as the source to the output of another decoding device when the switch controlling device is instructed to start repetitive reproduction by the start instructing device, and
   the decode controlling device controls the decoding devices so that said another decoding device decodes the information on and after the start position and said one decoding device can begin to decode the information on and after the start position when the switch controlling device is instructed to start repetitive reproduction by the start instructing device.

2. The information reproduction apparatus according to claim 1 further comprising:
   a buffer device for storing the information recorded in the information recording medium at a front stage of said decoding devices; and
   a buffer controlling device for storing the information at least on and after the start position in the buffer device when the start position is designated, and for supplying the information on and after the start position from the buffer device to said another decoding device when the switch controlling device is instructed to start repetitive reproduction by the start instructing device.

3. An information reproduction method comprising the processes of:
   reading information recorded in an information recording medium;
   decoding the read information by using a plurality of decoding devices;
   switching a source of an output of the information reproduction among outputs of a plurality of the decoding devices;
   designating a start position to start repetitive reproduction;
   controlling the decoding devices so that another decoding device except one decoding device whose output is currently switched as the source can begin to decode the information on and after the start position after the start position is designated;
   providing an instruction of start of repetitive reproduction;
   switching the source from the output of one decoding device whose output is currently switched as the source to the output of another decoding device when the instruction is provided; and
   controlling the decoding devices so that said another decoding device decodes the information on and after the start position and said one decoding can begin to decode the information on and after the start position when the instruction is provided.

4. The information reproduction method according to claim 3 further comprising the processes of:
   storing the information at least on and after the start position in a buffer device before the information is decoded when the start position is designated; and
   supplying the information on and after the start position from the buffer device to said another decoding device when the instruction is provided.

5. The apparatus of claim 1, wherein each of the decoding devices is capable of decoding a same kind of information.

6. The apparatus of claim 1, wherein during the repetitive reproduction, a predetermined duration of data is decoded starting from the start position repeatedly.

7. The method of claim 3, wherein each of the decoding devices is capable of decoding a same kind of information.

8. The apparatus of claim 1, wherein during the repetitive reproduction a predetermined duration of data is decoded starting from the start position repeatedly.

9. An information reproduction apparatus comprising:
 a plurality of decoding devices each capable of decoding a same information;
 a start instructing device for providing instructions to start repetitive reproduction;
 a switch controlling device for switching a source from a first device from the plurality of decoding devices currently outputting decoded data to a second device from the plurality of devices after the start instruction device provides instructions to start the repetitive reproduction.

10. The apparatus of claim 9, further comprising;
 a designating device for designating a start position for the repetitive reproduction; and
 a decode controlling device for controlling the plurality of decoding devices such that after the start repetitive reproduction instruction is received, said second decoding device decodes information on and after the start position.

11. The apparatus of claim 9, wherein during a repetitive reproduction a predetermined duration of data is decoded starting from the start position repeatedly.

12. The apparatus of claim 9, further comprising:
 a buffer device for storing information; and
 a buffer controlling device for storing information on and after the start position in the buffer device after the start position is designated.

13. The apparatus of claim 12, wherein the buffer device supplies information for decoding to the second decoding device.

14. A method of repetitive reproduction of data comprising:
 a) decoding data using a first decoding device from a plurality of decoding devices;
 b) designating a start position;
 c) receiving instruction for repetitive reproduction; and
 d) decoding data using a second decoding device from the plurality of decoding devices after receiving the instruction for the repetitive reproduction.

15. The method of claim 14, wherein after the start repetitive reproduction instruction is received, said second decoding device decodes information on and after the start position.

16. The method of claim 14, wherein during a repetitive reproduction, a predetermined duration of data is decoded starting from the start position repeatedly.

17. The method of claim 14 wherein information on and after the start position is recorded on a buffer device.

18. The method of claim 17, wherein the information stored in the buffer device is supplied to the second decoding device.

* * * * *